United States Patent [19]
Holper

[11] 3,757,149
[45] Sept. 4, 1973

[54] SHADING COIL MOTOR ASSEMBLY
[75] Inventor: Frank Holper, Cary, Ill.
[73] Assignee: Molon Motor & Coil Corp., Rolling Meadows, Ill.
[22] Filed: Feb. 16, 1972
[21] Appl. No.: 226,787

[52] U.S. Cl. ............ 310/114, 310/172, 310/83
[51] Int. Cl. ............................. H02k 17/10
[58] Field of Search............ 310/162, 163, 40 MM, 310/172, 83, 112, 114, 90, 250, 62, 166; 74/409, 411

[56] References Cited
UNITED STATES PATENTS

| | | | |
|---|---|---|---|
| 1,750,240 | 3/1930 | Myer | 310/172 |
| 3,555,317 | 1/1971 | Allan | 310/62 |
| 3,543,064 | 11/1970 | Holper | 310/90 |
| 3,512,732 | 5/1970 | Walsh | 310/172 |
| 3,144,597 | 8/1964 | Lee | 310/162 |
| 3,163,791 | 12/1964 | Carlson | 310/112 |
| 934,391 | 9/1909 | Conrad | 310/172 |
| 3,122,666 | 2/1964 | Guiot | 310/162 |

Primary Examiner—R. Skudy
Attorney—James B. Kinzer et al.

[57] ABSTRACT

A shading coil motor assembly including a pair of juxtaposed stator frames, each having a rotor, a common coil to produce magnetic flux for both stator frames, and drive shafts joined to the rotor on spaced, parallel axes for delivering torque to a common gear and output shaft.

6 Claims, 4 Drawing Figures

3,757,149

SHADING COIL MOTOR ASSEMBLY

This invention relates in general to electric motors, and more particularly to a shading coil motor assembly utilizing a double rotor-stator arrangement to drive a single output shaft.

Small, single-phase induction motors of small fractional horsepower are sometimes started by means of a low-resistance, short-circuited single loop of heavy copper wire, commonly called a shading coil, which is placed around one tip only of each pole, known as a shading pole. This type of motor is further characterized by a field or main winding connected to the source of electric power and wrapped around an iron core, corresponding to the primary coil or winding of a transformer. Each shading coil corresponds to a secondary transformer winding, short-circuited on itself. When the alternating current from the power source, and therefore the field flux, are increasing, a portion of the flux cuts each shading coil. This establishes current in the shading coils, which sets up a flux in the related shading poles opposite the main field flux, and hence lines of magnetic force pass only through the unshaded sections of the poles.

The effect of the shading coils is to cause a flux to sweep across the pole faces, from the unshaded to the shaded pole sections. A weak rotating field is thus established, exerting a starting torque on the rotor.

In Holper U. S. Pat. No. 3,543,064, a shading coil motor is constructed from two iron frames (laminated) arranged end-to-end in tandem relation with the two air gaps aligned coaxially. A single coil is lapped about both frames. Each frame houses a rotor, the two rotors being in coaxial alignment, and a comparatively long, common drive shaft is coupled to the rotors. The drive shaft is equipped with a drive gear, driving a pair of gears opposed thereto, and in turn the opposed gears are coupled to a common output gear.

The motor of the Holper patent, characterized by a single coil (copper wire) embracing two iron frames was devised in an attempt to maximize the coil effect since one coil is cheaper than two; or in other words the ratio of cooper:iron was reduced. Such a motor can be built to deliver as much as one-twentieth horsepower at the drive gear identified above, a commendable achievement for a shading coil motor. The construction, nonetheless, is expensive for while there is conservation in the copper cost, other costs are increased. Thus, the long drive shaft represents an appreciable unsupported length requiring a heavier shaft and heavy duty bearings in order to reduce shaft whip. Exceptionally long mounting pins are required to support the frames, making it difficult to comply with tolerance allowances. It is not a matter of a straight line increase in cost, but rather a geometrical or exponential increase. Briefly, there is a diproportionate cost when it comes to shaft support and frame support.

In view of the foregoing the primary object of the present invention is to construct a shading coil motor capable of delivering as much as one-twentieth horsepower, incorporating the concept of a single coil servicing two frames, but with the frames so placed that the rotors are on parallel axes rather than on a common axis. With the rotors so placed, compared to the arrangement of Holper U.S. Pat. No. 3,543,064, and in compliance with further objects of this invention, it is still possible to use a single coil and yet the drive shafts may be shorter with less possibility of whip, the bearing supports need not be of a heavy duty type, the gearing is less strained, tolerances are more easily met, gear reduction may be easily varied. As to the latter, gear reduction in Holper U.S. Pat. No. 3,543,064 was limited between the centers of the two gears 65 and 66 thereof.

Other and further objects of the present invention will be apparent from the following description and claims and are illustrated in the accompanying drawings which, by way of illustration, shows a preferred embodiment of the present invention and the principle thereof and what I now consider to be the best mode in which I have contemplated applying that principle. Other embodiments of the invention embodying the same or equivalent principles may be used and structural changes may be made as desired by those skilled in the art without departing from the present invention.

Figure 1:
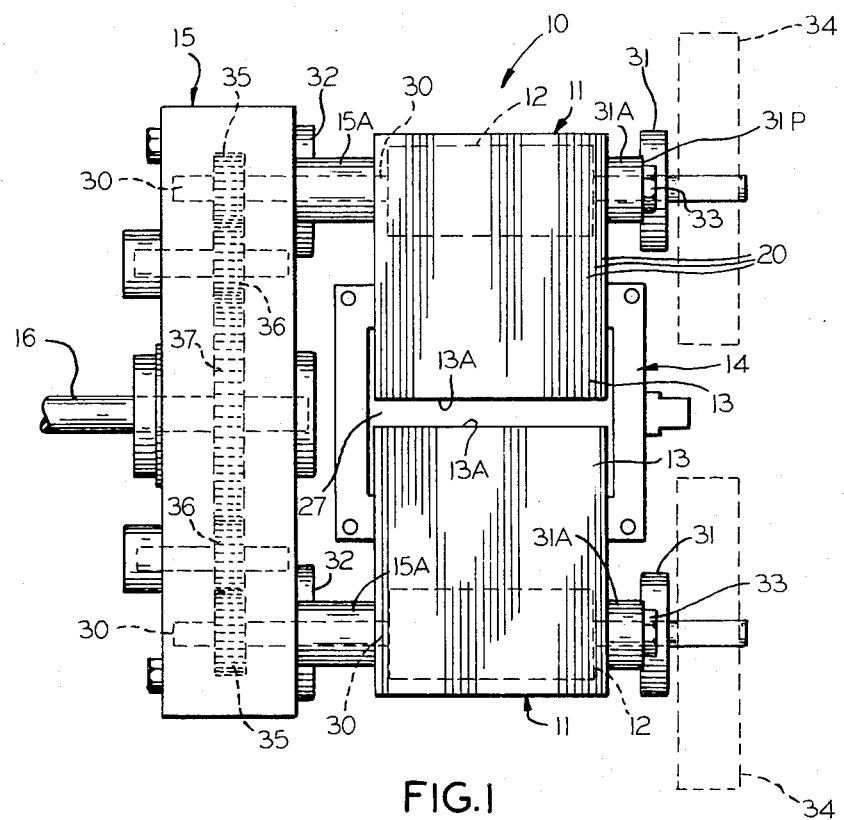
FIG. 1 is a side elevational view of a motor assembly constructed in accordance with the present invention.

The shading coil motor assembly of the present invention, generally identified by reference character 10, comprises a pair of juxtaposed magnetic stator frames 11, a pair of rotors 12, one associated with each stator frame, a pair of coil cores 13, one associated with each stator frame, a common coil 14 embracing both cores 13 to develop magnetic flux in both stator frames, a single gear box 15 receiving the outputs of both rotors 12, and a common output shaft 16 extending from the gear box.

Figure 2:
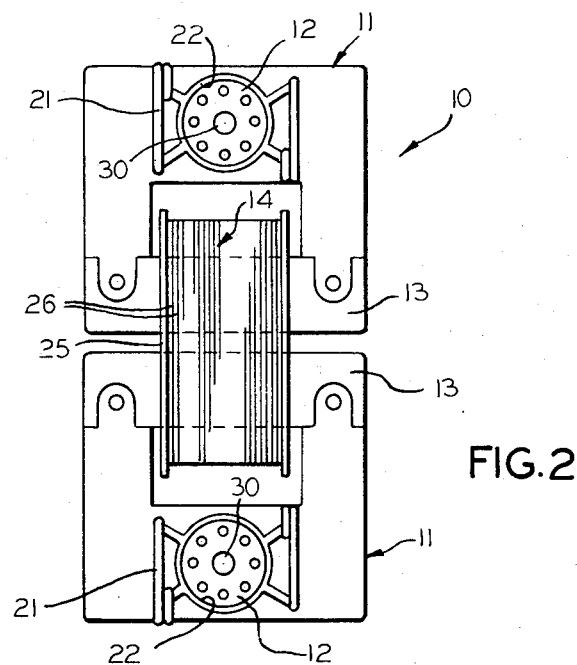
FIG. 2 is an elevational view taken substantially along line 2—2 of FIG. 1.

Each stator frame 11 is U-shaped, FIG. 2, and includes a plurality of stacked liaminations 20 in the form of iron plates. Shading coils 21, FIG. 2, are mounted on each frame 11. Rotor cavities 22 are formed in each frame for receiving the rotors 12 which rotate freely therein. The rotors are in parallel spaced relation and extend through the cavities along axes perpendicular to the laminations.

The cores 13 face each other and extend across and close the open ends of the U-shaped frames 11. The cores, like the frames, are defined by laminations of an equal number as in the frames so that the thicknesses are identical. The frames and cores are split to facilitate assembly of the motor. Since the frames are in side-by-side relationship, the cores are in closely spaced parallel relation wherein their side faces 13a are in juxtaposed parallel spaced relation.

The coil 14 includes a conventional bobbin 25 formed of insulating material with a plurality of copper wire windings 26 thereon. Both the bobbin and the windings define a core opening 27 through which extend the cores 13. Accordingly, it is seen that the single coil 14 commonly embraces both cores 13 to produce flux for both stator frames when energized by a suitable potential, such as an alternating current voltage.

Each motor 12 is carried on a rotor shaft 30. Each shaft 30 is supported at one end by a bearing assembly 31. The bearing assembly 31 is at the medial area of a yoke or plate 31P. The yoke is a die casting and is provided at each end with spacers 31A.

Each shaft 30 is supported at the other end by a bearing assembly 32 which extends from and is an integral part of the gear box 15. The gear box is a die casting and includes spacers 15A opposed to the spacers 31A. The frames are rigidly tied to the gear box by pins having bolt heads 33 at one end and threads (not shown) at the other end fitting tapped openings in the spacers 15A.

The rotor shafts 30 extend outward of the bearing assemblies 31 and may have mounted on their adjacent ends fans 34 which are driven by the rotor shafts to cause a flow of air across the stator frames 11 to enhance cooling of the motor assembly.

The rotor shafts 30 likewise comprise inputs to the gear box 15 wherein the outputs of the rotors are transmitted to the gear box and ultimately to the single common output shaft 16. Drive gears 35 are secured to the rotor shafts 15 and in meshing engagement with idler gears 36, the latter of which are suitably supported by bearings within the gear box. The idler gears 36 in turn engage a common driven gear 37 which is mounted on the output shaft 16 whereby power is transmitted from the rotor shafts through gears 35 and 36 to gear 37 and the common output shaft 16. The sizes of the drive gears 35 and the idler gears 36 are identical, while the driven gear 37 is substantially larger, thereby effecting a reduction in the gear train between the rotor shafts and the output shaft.

Characteristic of a shading coil motor is a tendency to overheat. For example, a single rotor shading coil motor having a frame and core assembly 2 inches thick with 310 turns of number 22 wire on the field coil operating at 2.6 amps and 140 watts, will after 7 minutes of running exceed an allowable 140°C rise in temperature, the maximum permitted under Underwriters' Laboratories standards. However, the twin rotor shading coil motor assembly of the present invention with a single field coil of 300 turns of number 21 wire and twin 2-inch thick frame and core assemblies, will run continuously (with no fan) drawing 1.15 amp and 77 watts, and sustain a temperature rise of only 98.2°C without fans. There is more iron to radiate heat, but optionally, the fans 34 may be used to enhance cooling if needed or desired.

A shading coil motor with a 2-inch thick iron frame and core assembly having about 350 turns in the field coil will produce a starting torque of 10 to 12 ounces, while coupling together a pair of stator frames with a single coil of only about 200 turns under the present invention will produce about 18 ounces of starting torque which results in a 50 percent increase with less copper. Again, the cooler motor is more efficient. Admittedly, there is a slight increase in torque efficiency wherein two drive pinions in a gear box necessarily and inherently impart a balanced drive to the output shaft of the gear box but such a balanced drive arrangement accounts for at the most only 10 percent of the increased torque. The motor assembly of the present invention will develop about one-twentieth of a horsepower, which is not possible with a shading coil motor of standard construction characterized by a single rotor and single frame arrangement. It should also be noted here that a capacitor motor with a gear box and rated equally to a motor constructed in accordance with the present invention would cost at least twice as much as the motor assembly of the present invention.

Figure 3:
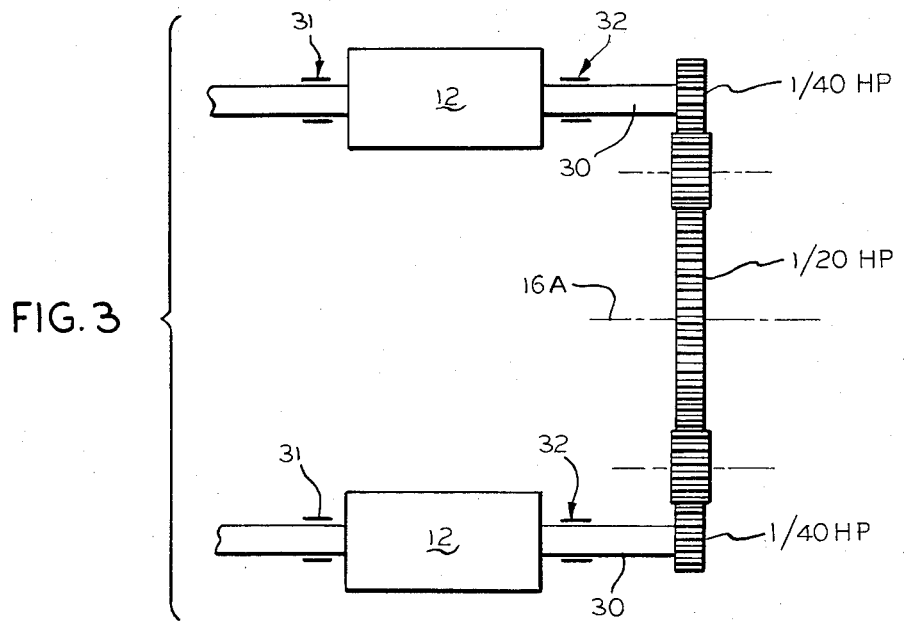
FIG. 3 is a schematic view of the present motor.
Figure 4:
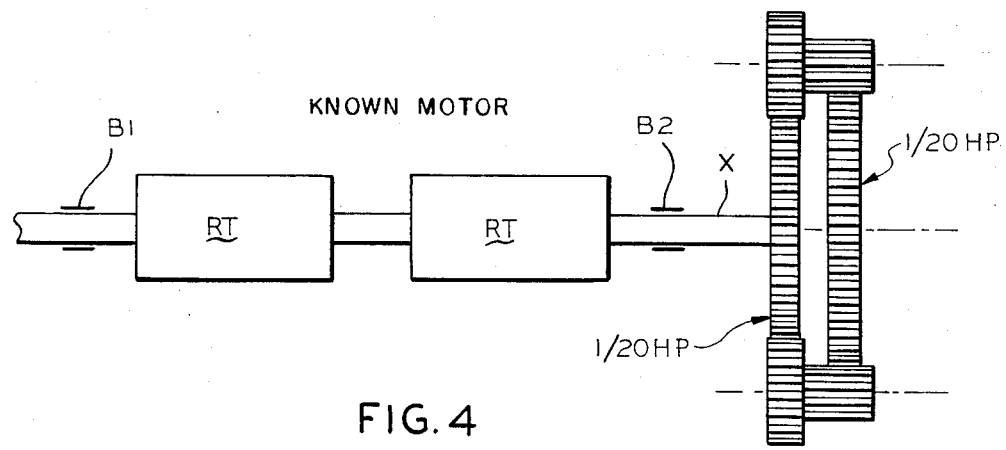
FIG. 4 is a schematic view of a known motor.

It will be appreciated that each rotor shaft delivers one-half the output, namely, about one-fortieth horsepower. The strain on the rotor shaft bearings is less than if there was one rotor shaft delivering one-twentieth horsepower, to say nothing of the reduced cost factors mentioned above represented by the fact that in motors of this kind the cost of bearings and shafts increases as the (torque or power)$^2$. Additionally, the gears 35 in delivering only one-fortieth horsepower place less strain on the gear train compared to the arrangement in the Holper patent where the rotor gear (gear 36) delivers one-fortieth horsepower. This can be seen from FIGS. 3 and 4, approximately to scale, where FIG. 3 is a schematic view of the present motor and FIG. 4 is a schematic view of the motor of Holper U.S. Pat. No. 3,543,064. In FIG. 4, B1 and B2 identify the bearing supports for the drive shaft coupling the two coaxial rotors RT.

It will be understood that modifications and variations may be effected without departing from the scope of the novel concepts of the present invention, but it is understood that this application is to be limited only by the scope of the appended claims.

I claim:

1. A shading coil motor assembly comprising a pair of juxtaposed identical magnetic stator frames, a rotor cavity in each frame, shading coil means on each frame, a rotor in each rotor cavity and each rotor having a rotor shaft, the rotational axes of said rotor shafts being in juxtaposed parallel spaced relation, a single common coil connected to said stator frames to develop magnetic flux simultaneously in both stator frames when the coil is energized, and means for coupling the rotor shafts to a single output shaft.

2. The combination as defined in claim 1, wherein fans are coupled to the rotor shafts for creating a flow of air across the stator frames.

3. The combination as defined in claim 1, wherein said coupling means includes a gear box.

4. A shading coil motor assembly comprising a pair of juxtaposed U-shaped magnetic stator frames, a rotor cavity in each frame, shading coil means on each frame at the cavity, a rotor freely rotatable in each rotor cavity, each rotor having a rotor shaft the rotational axes of said rotor shafts being in juxtaposed parallel spaced relation, the open ends of the U-shaped frames facing each other and being closed by magnetic coil cores, a common coil wrapped around said coil cores to develop magnetic flux simultaneously in both coil cores when the coil is energized, and means for coupling the rotor shafts to a single output shaft.

5. A shading coil motor assembly as defined in claim 4, wherein said coupling means includes gearing means connecting the rotor shafts to the output shafts.

6. A shading motor assembly is defined in claim 5, wherein said rotor shafts extend from both ends of the rotors, and fans are mounted on one end for cooling purposes.

* * * * *